United States Patent [19]
Beeman et al.

[11] Patent Number: 5,840,571
[45] Date of Patent: Nov. 24, 1998

[54] BIOLOGICAL DEGRADATION OF HALOGENATED COMPONENTS IN THE UNSATURATED SOIL ZONE

[75] Inventors: Ralph Emerson Beeman, Victoria; Stephen Hoover Shoemaker, Spring, both of Tex.

[73] Assignee: E. I. du Pont de Nemours and Company, Wilmington, Del.

[21] Appl. No.: 571,059

[22] Filed: Dec. 12, 1995

[51] Int. Cl.$^6$ ................ C02F 3/00; C12N 1/00; C12N 1/20; B09B 3/00
[52] U.S. Cl. ............ 435/262.5; 210/600; 210/601; 435/252.1; 435/822
[58] Field of Search .............. 210/600, 601; 435/252.1, 262, 262.5, 822

[56] References Cited

U.S. PATENT DOCUMENTS

| | | | |
|---|---|---|---|
| 4,451,372 | 5/1984 | Rovira | 210/603 |
| 4,593,760 | 6/1986 | Visser et al. | 166/267 |
| 4,660,639 | 4/1987 | Visser et al. | 166/267 |
| 4,713,343 | 12/1987 | Wilson, Jr. et al. | 435/264 |
| 4,749,491 | 6/1988 | Lawes et al. | 210/610 |
| 5,006,250 | 4/1991 | Roberts et al. | 210/610 |
| 5,180,495 | 1/1993 | Thuer et al. | 210/605 |
| 5,200,343 | 4/1993 | Cole et al. | 435/262.5 |
| 5,232,596 | 8/1993 | Castaldi | 210/603 |
| 5,277,815 | 1/1994 | Beeman | 210/605 |

FOREIGN PATENT DOCUMENTS

| | | |
|---|---|---|
| 3605042A1 | 2/1986 | Germany . |
| WO 95/00208 | 1/1995 | WIPO . |

OTHER PUBLICATIONS

Gary C. Barbee, Fate of Chlorinated Aliphatic Hydrocarbons in the Vadose Zone and Ground Water, *Ground Water Monitoring Review*, vol. 14, No. 1, pp. 129–140 XP000646733, 1994.

D.H. Kampbell and B.H. Wilson, Bioremediation of Chlorinated Solvents in the Vadose Zone, *Biomediation of Chlorinated and PAH Compounds*, pp. 255–258, Nov. 7, 1995.

Robertson, "Chemical . . . Sit . . . DCE", Env. Tox. & Chem 13(2) 1994 pp. 183–191, see abst. only.

*Primary Examiner*—David M. Naff
*Assistant Examiner*—Deborah K. Ware

[57] ABSTRACT

A Process using anaerobic, aerobic, and cometabolizing bacteria to biodegrade halogenated organic compounds in an unsaturated zone lyng between the ground surface and the underlying water table is disclosed. The process includes contacting in situ an electron donor compound with dehalogenating bacteria indigenous in or added thereto in the unsaturated soil zone which is between the ground surface and underlying water table. Further the halogenated component compounds also react with the bacteria and electron donor; thus, stimulating biodegradation while cycling between aerobic and anaerobic as well as cometabolic environments during the process.

16 Claims, 3 Drawing Sheets

BIOLOGICAL DEGRADATION OF HALOGENATED COMPONENTS IN THE UNSATURATED SOIL ZONE

FIELD OF THE INVENTION

This invention provides in situ processes for the controlled degradation of contaminants in the unsaturated zone lying between the ground surface and the underlying water table. More specifically, the process of the present invention utilizes indigenous anaerobic, aerobic, and cometabolizing bacteria to biodegrade halogenated organic compounds in the unsaturated zone.

BACKGROUND OF THE INVENTION

Chemical contamination of the subsurface environment, both in the unsaturated and saturated zones, has occurred extensively in the United States and worldwide, threatening the use of sites and creating ground water hazards. The contamination comes from many industrial and municipal sources, including lagoons, landfills, chemical storage areas, spills and leaks from transportation facilities, and from both underground and above ground storage tanks.

Halogenated solvents, used for dry cleaning, degreasing, and numerous other purposes are some of the most common and potentially hazardous soil and ground water pollutants. Left untreated in the ground, these pollutants can be long-lived, and the polluted zone can expand through diffusion and ground water movement, creating a much more extensive pollution problem.

Relevant discussions of the problems of chlorinated aliphatic hydrocarbons in the unsaturated zone and ground water was provided by G. C. Barbynee, "Fate of Chlorinated liphatic Hydrocarbons in the Vadose Zone and Ground Water", in Ground Water Monitoring Review 14 #4, 1994 pp. 129–140 and and book of Bioremediation, Robert D. Norris, et al., Lewis Publishers, ISBN 1-56670-074-4 (1994), specifically Sections 5 and 6 (pp. 87–129).

Some methods for treatment of ground water from the saturated zone involve "pump and treat" methods in which ground water is withdrawn from an appropriately-designed matrix of extraction wells in the contaminated zone. The contaminated water is drawn from extraction wells, treated to remove or degrade the contaminants, and optionally returned to the zone through injection wells. Such methods are expensive, require extended time periods before treatment is complete, and may create additional wastes.

It is known that aerobic bacteria can be used for the in situ biodegradation of contaminants. Although aerobic degradation techniques have achieved some success in degrading pollutants, in some cases such methods can produce degradation products with their own hazardous pollutant properties. Additionally, aerobic bacteria may be very limited in their ability to degrade certain pollutants, even after extended periods of exposure. Both these limitations of aerobic bacteria are of concern when the pollutants are halogenated organic compounds.

By the term "bioremediation", as used herein, is meant a reduction in the amount of a contaminant such as a halogenated aliphatic hydrocarbon brought about by microbiological metabolism or cometabolism. The term "bioremediation" as used herein does not necessarily mean that all the contaminant is removed by microbiological activity. For example, initially vapor concentrations may be sufficiently high that the most economical disposal method is incineration. As vapor is extracted, contaminant vapor concentrations diminish and incineration costs rise per unit of contaminant destroyed. At this point in site remediation, bioremediation may become the most economical method of contaminant destruction. As concentrations further decrease, techniques such as carbon absorption may become preferred. Use of such options to minimize overall remediation costs are well known to those skilled in the art. Indeed, combinations of these methods may be employed simultaneously.

In the bioremediation of sites contaminated with halogenated compounds, the use of anaerobic followed by aerobic conditions has been found effective. A process has been disclosed for the decontamination of ground water using a multistage ex situ biofilter having an optional aerobic stage followed by anaerobic and aerobic stages. Another ex situ process used multiple reactors to provide an anaerobic biofilter followed by an aerobic biofilter. Furthermore, the sequenced anaerobic treatment for the saturated zone followed by aerobic treatment was developed as an in situ process. This last process used injected pulses of electron donor solution and electron acceptor solution into the ground water.

A process was disclosed by Beeman in U.S. Pat. No. 5,277,815, utilizing an in situ controlled process for the biodegradation of halogenated organic compounds in a contaminated zone within the subsurface water table, commonly called the saturated zone. Beeman's multistep process provides an electron donor, exemplified by sodium benzoate, to stimulate indigenous reducing microorganisms while maintaining a sulfate reducing environment to limit formation of haloethenes. Subsequently the system is converted to an aerobic environment by supplying an electron acceptor, exemplified by oxygen or hydrogen peroxide. The two-step in situ process dehalogenates the more highly halogenated compounds with minimum haloethene formation under anaerobic conditions, then completes the biodegradation of remaining less halogenated compounds to innocuous organic compounds, carbon dioxide, water, and halogen salts. Optionally, suitable bacteria, exemplified by dehalogenating bacterium strain *Desulfomonile tiedjei*, Desulfobacterium, Methanobacterium, and Methanosarcina, may be added to the saturated zone if it lacks appropriate indigenous bacteria. Beeman's process specifically addressed the need to minimize the formation of haloethenes and simplified the process controls required. The ability to biodegrade halogenated hydrocarbons such as tetrachloroethene in ground water to ethene and other innocuous compounds without formation of significant chloroethene, as provided by Beeman, represents a major improvement in remediation. However, since ground contamination typically occurs at or near the ground surface, situations commonly occur in which the contaminants are located in the unsaturated zone. The contaminant is normally more concentrated while in the unsaturated zone. Since a treatment such as that in U.S. Pat. No. 5,277,815 is applicable only to the saturated zone, an undesirable delay is involved while the contaminants percolate or otherwise diffuse through the unsaturated zone into the saturated zone.

Methods for the treatment of the unsaturated zone include excavation and treatment of the soil, e.g., by incineration, in situ heat treatments such as by the injection of steam, and methods for the diffusion of air through the unsaturated zone to entrain volatile contaminants. Processes have been described that extract vapors from the unsaturated zone by vacuum extraction wells and augment the extraction by injecting air into the unsaturated zone. Such techniques either transfer the pollutants to the atmosphere or require entrapment of the steam and air emanating from the treated zone and subsequent ex situ treatment of the collected condensate or air to remove or degrade the contaminants. Again, such methods are expensive, require extended time periods before treatment is complete, and may create additional wastes.

Finally, an in situ process has been described that uses non-porous gas permeable hoses, for instance made of silicone rubber, buried in the unsaturated zone. By passing suitable gases under pressure through the system of hoses, the soil of the unsaturated zone is exposed alternately to anaerobic and aerobic conditions creating a biofilm on the outside of the hoses.

It is desirable to be able to apply a degradation process and the simpler process control requirements of Beeman's in situ saturated zone process to the bioremediation of halogenated organic compounds present as gas, vapor, and liquid in the unsaturated zone, without either requiring removal of the contaminants for treatment in an ex situ device or necessitating placement and maintenance of extensive underground hose matrices, including prevention of biofouling and clogging. Additionally, such an in situ process is desirable because it is potentially applicable to much larger contaminated sites. The process of the present invention achieves this.

BRIEF SUMMARY OF THE INVENTION

The present invention comprises a process for biodegrading halogenated organic compounds in an unsaturated subsurface environment comprising contacting in a gas phase or vapor phase an electron donor compound with dehalogenating bacteria in an unsaturated subsurface environment to stimulate anaerobic biodegradation of said halogenated organic compounds. The unsaturated subsurface environment is initially an aerobic, anaerobic, or cometabolic environment. It is converted from an anaerobic to an aerobic environment by supplying a source of oxygen to activate aerobic bacteria for degradation of the halogenated compounds. It is converted from an anaerobic to a cometabolic environment by supplying a source of cometabolic activity to degrade the halogenated compounds. Cycling between aerobic, anaerobic, or cometabolic environments in any sequence as needed to degrade the halogenated compounds to innocuous compounds and water is conducted.

DETAILED DESCRIPTION OF THE INVENTION

This invention is an improved process for the decontamination of the specific soil zone between the ground surface and the underlying water table. This zone is commonly termed the unsaturated or vadose zone; hereinafter the term unsaturated zone is used. The process of this invention may be utilized in situ in the unsaturated zone. The process of this invention utilizes the ability of indigenous microorganisms, or microorganisms added to the unsaturated zone, to degrade anaerobically, aerobically, or cometabolically, the contaminants present in the unsaturated zone. Identification of the active microorganisms is seldom necessary. When initial tests show indigenous microorganisms are absent or incapable of contaminant bioremediation, supplementation with metabolically competent microorganisms is necessary. Optionally, suitable bacteria, exemplified by the dehalogenating bacterium Desulfomonile, Desulfobacterium, Methanobacterium, and Methanosarcina, are added to the unsaturated zone if the unsaturated zone lacks competent indigenous bacteria.

Generally, anaerobic biodegradation in the unsaturated zone is a concept utilizing the contaminants in the unsaturated zone and in the absence of oxygen, as electron acceptors for indigenous or exogenous electron donors contained in the soil matrix. This process contrasts with aerobic degradation, in which the contaminant is utilized as an electron donor to indigenous or exogenous electron acceptor, oxygen. The endogenous or exogenous electron donors involved in the anaerobic process can be intentionally moved through the unsaturated zone.

Organic and inorganic compounds such as aliphatic hydrocarbons and fuel components including benzene, toluene, xylene, and ethylbenzene are well known to degrade in situ in the presence of aerobic microorganisms in aerobic environments. The process of this invention also biodegrades such aliphatic hydrocarbons and fuel components. Many chlorinated aliphatic hydrocarbons, including tetrachloroethene, trichloroethene, pentachloroethane, 1,1,1-trichloroethane, 1,1- and 1,2-dichloroethane, chloroethene, and chlorinated aromatics (chlorobenzene, chlorinated biphenyls), and chlorine-containing pesticides, do not readily undergo aerobic biodegradation. These halogenated organics are more readily biodegraded under anaerobic (reducing) conditions, by sequential anaerobic to aerobic conditions, or by a sequence of conditions including anaerobic, aerobic, and cometabolic conditions, under appropriate environmental and substrate conditions in the presence of suitable microorganisms.

Brominated compounds (including, for example, ethene dibromide, methyl bromide, and tribromomethane) and fluorinated compounds (including, for example, trichlorofluoromethane and 1,1,2-trichlorotrifluoroethane) are also biodegraded in soil using the process of this invention.

A wide range of non-halogenated contaminants are bioremediated, including, for example, aliphatic and aromatic hydrocarbons (volatile electron donors), and organic nitro and sulfur compounds.

Aerobic bioventing is a process in which oxygen or the oxygen in air is the electron acceptor. The oxygen or air is driven by pressure and/or drawn by evacuation through the contaminated unsaturated zone and endogenous microorganisms degrade the organic contaminants.

However, anaerobic biodegradation processes, such as those desired for the degradation of halogenated organic contaminants, are normally inhibited by oxygen. Indeed it is well documented that anaerobic microorganisms can degrade, for instance, tetrachloroethene to trichloroethene, 1,1- and 1,2-dichloroethene, 1,1- and 1,2-dichloroethane, chloroethene, chloroethane, ethene, and ethane.

Figure 3:
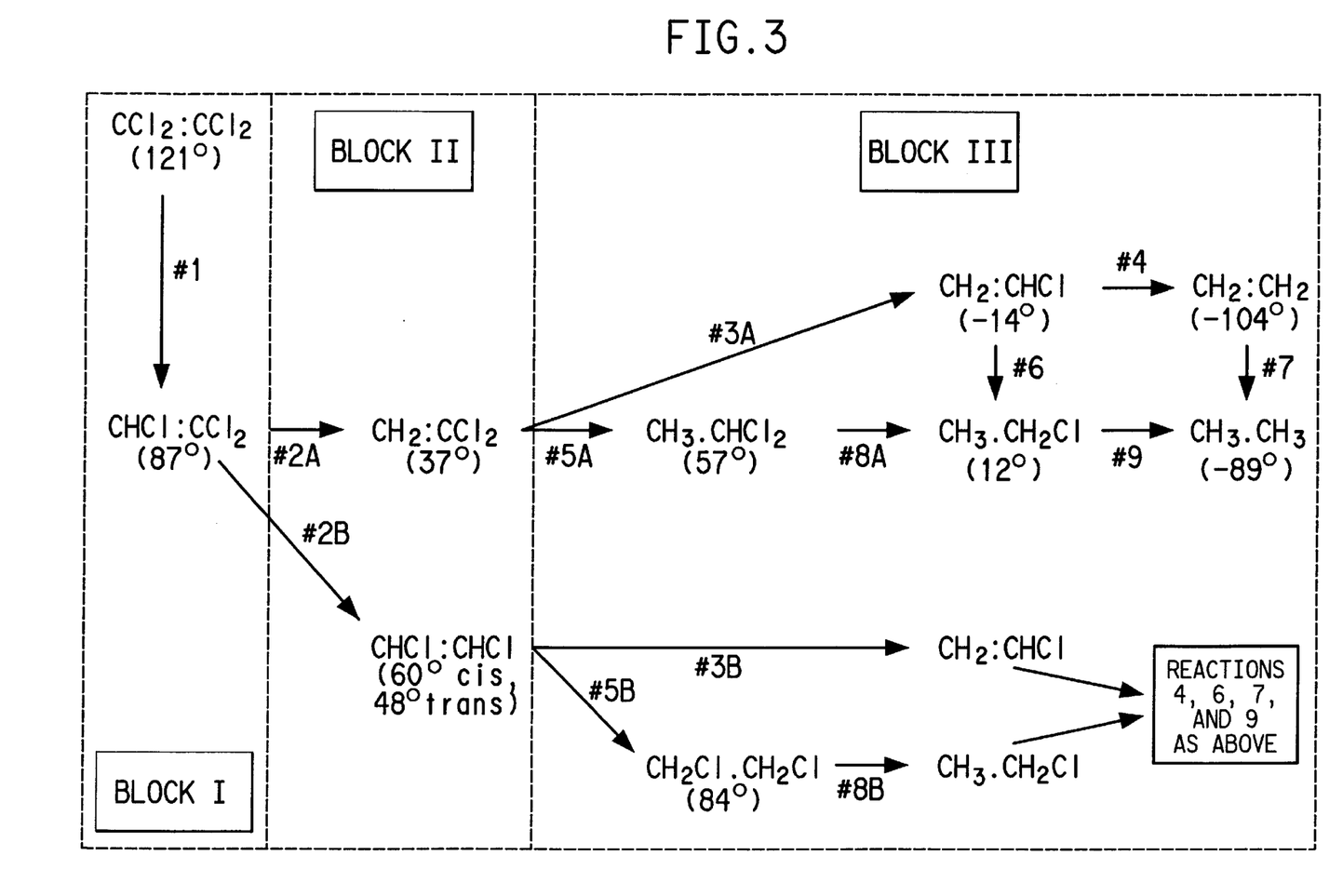
FIG. 3 is a schematic diagram of the degradation reactions of tetrachloroethene.

FIG. 3 shows the anaerobic biodegradation pathways for tetrachloroethene with the boiling points in degrees Centigrade in parentheses as for example "(121)", and numbered reaction steps as for example "#1". Steps 2, 3, 5, and 8 involve the 1,1- and 1,2- isomers (e.g., 2A and 2B). A reference to a particular step means a summation of its substeps A and B. FIG. 3 is adapted from Norris, et al. (op. cit.) and indicates that as tetrachloroethene and trichloroethene degrade under anaerobic conditions, their degradation products "cascade" through a sequence of degradation products finally to form ethene and ethane. The approximate amount of a specific compound that is degraded in a static mode, i.e., during a period in which negligible contaminants are removed, is the sum of (i) the decrease in the amount of the compound for the period and (ii) the decrease in the amount of the precursor compound occurring concurrently. In a dynamic mode, in which large amounts of contaminants and degradation products are removed and liquid or absorbed contaminants pass into the gas phase, the approximate amount of a specific compound that is degraded during a period is the sum of (i) the total amount of the subsequent degradation product removed during the period plus (ii) the period rate of biodegradation for the subsequent degradation product.

The amounts degraded in either a static or dynamic mode are necessarily approximate since, in a field test, a mass balance will not be exact. The molar amounts of $C_2$ products may differ from the contaminants consumed due to gains or losses through the perimeter, to the ground water below, or to the atmosphere above; due to retention or release of compounds by microorganisms; due to degradation of compounds in the anaerobic schematic by alternative oxidative pathways in locally aerobic spaces; or due to formation or degradation of dichloroethane isomers and chloroethane, since dichloroethane isomers and chloroethane were not measured.

FIG. 3 shows the reaction sequences for the degradation of tetrachloroethene to ethene and ethane. The reaction completed in Block I (Reaction #1, the degradation of tetrachloroethene to trichloroethene) apparently occurs only anaerobically. Reactions completed in Block II (Reactions #2A and #2B, the degradation of trichloroethene to dichloroethene isomers) can occur cometabolically and under anaerobic or aerobic conditions, but more rapidly anaerobically than aerobically. Reactions completed in Block III (Reactions #3A/B to #9, all other degradation reactions to ethene and ethane) can occur cometabolically and under anaerobic or aerobic conditions, but more rapidly aerobically than anaerobically.

The FIG. 3 reaction schematic shows progressive dechlorination and hydrogenation to more volatile degradation products. These more volatile degradation products would progressively be more readily entrained in the venting process. The unsaturated zone, in the process of this invention, is operated in modes combining anaerobic, aerobic, and cometabolic conditions either at different times or in spatially distinct zones within or between different geological formations. In practice, the unsaturated zone may initially be at least partially in an aerobic condition, but become anaerobic due to gas movement or by depletion of the oxygen content due to respiration of microorganisms. As described by Norris, et al., (op. cit.), while certain of these reactions occur abiotically, critical to the overall degradation in a practical time span is the biodegradation process. An important part of the biodegradation processes is cometabolic. Cometabolism is a fortuitous degradation by enzymes or cofactors produced by microorganisms for other purposes. Other chemicals must be present as primary substrates to satisfy the energy requirements of the microorganisms. Cometabolism substrates induce the action of the enzymes involved in cometabolism. Cometabolism substrates include methane, ammonia, phenol, toluene, propane, butane, O-cresol, m-cresol, tryptophane as well as chlorinated solvents including tetrachloroethene, trichloroethene, cis- and transdichloroethene, and chloroethane. Cometabolism can proceed under aerobic or anaerobic conditions. With the possible exception of tetrachloroethene, most of the chlorocompounds in the reaction schematic above, as well as many aliphatic and aromatic hydrocarbons can be degraded cometabolically.

While the applicant does not wish to be limited by the theory presented herein, the applicant believes that indigenous dehalogenating bacteria reduce the tetrachloroethene and trichloroethene in the presence of an electron donor, leading to the resulting intermediate products of 1,1- and 1,2-dichloroethene. Electron donors are inorganic or organic compounds capable of supplying an electron. Electron donors include hydrogen; sugars; volatile fatty acids and their salts; aliphatic, cycloaliphatic, and aromatic hydrocarbons; and the alcohols, amines, phenols, aldehydes, and ketones of aliphatic, cycloaliphatic, and aromatic hydrocarbons. Electron donors are exemplified by hydrogen; glucose or molasses; formate, acetate, benzoate, butyrate, crotonate, lactate, and propionate salts; and organic solvents such as cyclohexane, benzene, toluene, o-xylene, ethanol, isopropanol, methanol, acetone, methylamine, and trimethylamine. The applicant believes that then the 1,1- and 1,2-dichloroethene are further reduced to chloroethene by step 3 and subsequently to ethene and ethane according to the schematic of FIG. 3. Subsequently the system may be converted to a cometabolic or aerobic environment. For instance, the anaerobic to aerobic conversion is made by supplying an electron acceptor, exemplified by air or oxygen. This multistep in situ process dehalogenates the more highly halogenated compounds with minimum haloethene formation under anaerobic conditions, then completes the biodegradation of the remaining less halogenated compounds to innocuous organic compounds, carbon dioxide, water, and halogen salts. Compared with anaerobic conditions, aerobic conditions cause faster biodegradation of dichloroethene isomers, chloroethene, dichloroethane isomers, chloroethane, and ethene by oxidative pathways.

In the process of the present invention, cycling between anaerobic, aerobic, and cometabolic environments is conducted in any sequence as needed to degrade the halogenated organic compounds to innocuous compounds and water. Such cycling can occur, for example, in the following sequences:

a) anaerobic to aerobic,
b) anaerobic to cometabolic,
c) aerobic to anaerobic,
d) aerobic to cometabolic,
e) cometabolic to aerobic,
f) cometabolic to anaerobic,
g) anaerobic to aerobic to cometabolic,
h) anaerobic to cometabolic to aerobic,
i) aerobic to anaerobic to cometabolic,
j) aerobic to cometabolic to anaerobic,
k) cometabolic to aerobic to anaerobic,
l) cometabolic to anaerobic to aerobic, and
m) aerobic to anaerobic to aerobic to cometabolic.

Typically, a contaminated unsaturated zone may contain contaminant vapor in the gas phase of the zone, and a liquid or absorbed phase. The liquid or absorbed phase is hereinafter referred to as the "pool". In an unperturbed or natural situation, gas flow rates are typically very slow in the unsaturated zone, and often dominated by diffusion. Under such conditions negligible contaminant evaporates from the pool. For evaporation from the pool to occur, the gas phase must be moved by a pressure gradient, typically by the application of vacuum to the extraction wells. Additionally, without induced flow, microorganisms quickly reach a state in which they have exhausted one or more of the necessary contaminant substrates, essential nutrients, electron donors, electron acceptors, or cometabolites. Subsequent biodegradation becomes very slow as it is dependent upon diffusion and slow gas phase movement to alleviate the deficiency. The static bioremediation mode of Example 2 demonstrates such a situation.

This invention is directed to accelerating this very slow degradation that typically occurs in the relatively static gas phase of natural or unperturbed unsaturated zones. This is achieved by inducing unsaturated zone gas flow and mixing, thereby satisfying the metabolic needs of the microorganisms.

If the gas flow is increased, for instance by the application of a vacuum to the extraction wells, substrate, essential nutrient, electron donor, electron acceptor, and cometabolite supply to the microorganisms is increased, and the rate of biodegradation increases substantially. As demonstrated in the dynamic short path bioremediation mode of Example 2, chlorocarbon degradation rates are greatly increased over those observed in the static bioremediation mode. Furthermore, by selecting the extraction wells to which the vacuum is applied, and closing other wells, the gas flow in the unsaturated zone can be controlled so as to draw a chlorocarbon-contaminated gas flow through zones containing, for instance, needed electron donors. In the dynamic long path bioremediation mode of Example 2, chlorocarbon degradation rates are further increased by drawing chlorocarbon-contaminated gas into a hydrocarbon-contaminated zone, thereby supplementing the depleted electron donor supply and further enhancing the biodegradation rates for the chlorocarbons over the rates observed in the dynamic short path bioremediation mode. Alternatively, an electron donor deficiency can be alleviated by drawing hydrocarbon-contaminated gas into the chlorocarbon-contaminated zone. Other methods for supplying a depleted metabolite, such as infiltration trenches, introduction in the vapor phase through induction wells, etc., are discussed below.

Prior to use of the process of the present invention, soil borings are conducted to define the soil properties and stratigraphy affecting the transmission of contaminants and vapors through the subsurface. Techniques for conducting such surveys effectively and economically are well known to those skilled in the art, and are described, for example, by Johnson et al., in "A Practical Approach to the Design, Operation, and Monitoring of In Situ Soil-Venting Systems" in Ground Water Monitoring Review 10, #1, 1990, pp. 159–178 and G. D. Sayles in "Test Plan and Technical Protocol for a Field Treatability Test for Bioventing" from the Environmental Services Office, (US) Air Force Center for Environmental Excellence (AFCEE), May 1992. Johnson particularly describes the structure and design of a well field with emphasis on incineration of the extracted gases rather than bioremediation. The Air Force reference discusses aerobic, but not anaerobic, bioventing.

Piezometers (wells from which water level measurements are taken) are placed to determine water levels and define the depth of the unsaturated zone. Typically the sites of soil borings from the initial survey are used for the piezometers. Johnson, et al., describe plans for such a survey.

Simultaneously or sequentially with the soil borings, the contaminant distribution is surveyed through a soil gas survey. Essentially, a series of small diameter wells are placed into the unsaturated zone. A vacuum is applied to each well. Subsurface gases are collected into a Tedlar bag or the gases can be passed through a chemical trap, such as activated carbon or a Tenax trap. Such techniques are well known to those skilled in the art.

The soil gas is analyzed for volatile organic contaminant levels using either photoionization detectors or, for more complete and accurate measurement, gas chromatography (GC). Techniques for such analyses are well known, for instance a standard technique is described in EPA Method 8240 (US Environmental Protection Agency). Gases such as oxygen, nitrogen, carbon dioxide, methane, ethene, and ethane may be quantified to provide information on site microbial activity. Microbial activity is characterized by the consumption of oxygen and the production of various gases and vapors, including carbon dioxide, methane, hydrogen sulfide, carbon disulfide, etc. This microbial activity measurably alters the normal atmospheric composition (~21% oxygen and ~79% nitrogen, carbon dioxide, nitrogen oxides, methane, and sulfur compounds all much less than 1% or absent). If oxygen levels are depleted in the soil gas by bacteria, the carbon dioxide produced can be detected, as a terminal electron acceptor.

As metabolism continues in ecosystems depleted of oxygen, alternate electron acceptors are used. This includes available nitrate, sulfate and carbon dioxide. End products from nitrate are nitrogen oxides and nitrogen gas. Detection of large amounts of carbon dioxide and the appearance of nitrogen oxides implicates the presence and metabolic activity of nitrate/nitrogen oxide utilizing bacteria, normally referred to as denitrifiers. Nitrogen is also produced by denitrifiers, but detection against the high background of atmospheric nitrogen may be difficult.

The presence of large amounts of gaseous hydrogen sulfide, with carbon dioxide and possibly carbon disulfide, implicates the presence and metabolic activity of sulfate-reducing bacteria, referred to as sulfate-reducing bacteria or sulfidogens.

If sulfate and nitrate are depleted in the geological formation, then methanogenic activity may predominate, and be detected by the presence of large amounts of carbon dioxide, water and methane. The bacteria in this group are referred to as methanogens. Methanogens are well known to cause elevated methane concentrations in landfills due to their subsurface metabolic activity.

Other types of bacteria may also be detected by soil gas analysis. For instance, the complete dechlorination of tetra-chloroethene by microbial consortia produces gases such as ethene and ethane. The presence of such gases in anaerobic subsoil environments is a strong indication of dechlorination.

Finally, a pilot soil vapor extraction test often is conducted to determine soil gas transmission or soil permeability properties. This test is usually run by applying a steady vacuum to a vapor extraction well and measuring gas flow rate out of the well and distribution of the vacuum radially through the unsaturated zone. Results of the test are used to define necessary spacing of wells required to induce a given rate of soil gas pore volume exchanges over a given period of time.

The radial vacuum distribution is determined by measuring the vacuum on wells adjacent to and farther from the vacuum source. The typical initial assumption for well spacing is that soil permeability is roughly uniform throughout the formation in all directions, i.e., the soil properties are homogeneous and isotropic. Wells may be added or subtracted based on measured results. Hence, fine tuning is necessarily largely empirical. Such techniques are well know to those skilled in the art, and are described in the "Bioventing Guidance Document" previously cited.

The soil gas survey also provides measurements of the concentrations of electron acceptors (e.g., tetrachloroethene, trichloroethene, etc.) and volatile electron donors (e.g., gasoline).

Typically, the optimum ratio of carbon: nitrogen:phosphate (C:N:P) is assumed to be approximately 100:10:1 to 100:5:1. In most cases, addition of a carbon source, for instance methanol, is the primary requirement for anaerobic stages, and the system of wells can be used to introduce volatile carbon sources, and to accelerate the distribution within the site.

Water activity (Aw, defined as 1/100 of the % relative humidity) is measured in the soil gas samples or in a soil core. The Aw in most agricultural soils ranges from 0.9–1.0, a range desirable for the growth of bacteria. High humidity air can be introduced to raise the Aw in low humidity sites. Other procedures may be used, such as infiltrating water from the surface or "bioslurping", a process that involves temporarily drawing up the ground water by vacuum to wet the unsaturated zone soil particles. Additionally, water is an end-product of the biodegradation process.

In cases where electron donors are present, the subsurface contamination site is characterized by severe oxygen depletion, thus the process of venting air through the unsaturated zone is sufficient to greatly enhance biodegradation. Determination of the types and quantities of needed chemical additions is accomplished by chemical analysis of the vapor, water and solids in the formation. The results are compared to the chemical requirements of microorganisms. Thus a formation containing very little phosphate might require addition of appropriate phosphorus compounds. In most sites, supplementation of the nitrogen and phosphorus nutrients is not required.

However, under exceptional situations where it is required, nitrogen can be added to the site as gaseous nitric and nitrous oxides or as ammonia in the vapor feed streams to the wells. Other useful volatile organic nitrogenous compounds are amines (e.g., trimethylamine), amides, imides, and nitrites. Similarly, under exceptional conditions where it is required, phosphorus can also be added as organic phosphates, e.g., triethyl phosphate. Sulfur may be added as sulfur dioxide, but again most sites have sufficient sulfate.

In the process of the present invention, materials are introduced into the unsaturated zone through volatilization. If a vacuum or over pressure is induced at one well in the unsaturated formation, volatilized material will flow toward the points of lowest pressure. In this fashion vacuum or pressurization wells are used to control gas flow in the subsurface. Volatile organic and inorganic (e.g., hydrogen) materials introduced into this induced flow will be pulled through the formation. Thus vacuum and pressurization wells are used to influence the flow in the formation. Exit gases are recycled into the subsoil if desired.

Other techniques involve the use of infiltration trenches and bioslurping wherein ground water containing natural or supplemented concentrations of the necessary nutrients is temporarily drawn up into the unsaturated zone. Normally, geologic boundaries, such as clay or bedrock confining layers, control the flow of gases, vapors, and liquids at a site.

Although some chemicals, e.g., 1,1,1-trichloroethane, will hydrolyze abiologically to less chlorinated species with a half-life of one year or less, typically abiotic half-lives are longer and the practical removal of most chlorinated contaminants in situ requires biological degradation. Additionally, the existence of biotic processes gives a process controllability through environmental factors including humidity, substrates, and nutrients.

Over stimulation of growth by excessive or unnecessary nutrient additions is to be avoided since pores and flow paths in the soil formation can be plugged by excessive microbiological growth caused by excess nitrogen, phosphorus, or sulfur. Microbial activity and activity enhancement are the essential objectives, frequently more important than microbial growth.

Remediation progress at a site is controlled and measured through the monitor wells. Samples analyzed at intervals are used to determine the extent of bioremediation that has occurred, to follow the penetration of substrates and nutrients, and to determine necessary adjustments to the site. If the data show organic carbon has become limiting, a supplemental source of carbon is introduced to revive the microbial activity.

The site conditions or mode are cycled between any combination of aerobic, anaerobic, or cometabolic conditions in any sequence. As an example, an initially anaerobic zone may be cycled through anaerobic to aerobic to cometabolic conditions. As a further example, an initially aerobic zone may be cycled through aerobic to anaerobic to cometabolic conditions. The accumulation of a high concentration or mass of unwanted and incompletely degraded by-product typically indicates the need to cycle the system in this manner. Conversely a system continuing to degrade contaminants to innocuous end products indicates such cycling is not yet needed. As a specific example, if cis-1,2-dichloroethane or chloroethene starts to accumulate in the formation under anaerobic conditions, the site is cycled to aerobic conditions to permit the faster aerobic degradation of cis-1,2-dichloroethane and chloroethene.

Resampling the field should yield progressively lower amounts of halogenated hydrocarbons. Remediation is completed when the gas survey either shows no halogenated hydrocarbon or shows concentrations and quantities are below local and governmental standards or site remediation specifications.

At actual contamination sites where sufficient time elapses for the contaminants initially in the unsaturated zone to transfer to the saturated zone, it can be necessary to remediate both the unsaturated and the underlying saturated zone. By utilizing the present invention simultaneously with the process of U.S. Pat. No. 5,227,815, remediation of both zones can be achieved in parallel. This is a preferred approach, since otherwise migration of halogenated materials in the unsaturated zone may continue to contaminate the ground water. Thus a site could clean the ground water of chlorinated aliphatic hydrocarbons using the process of U.S. Pat. No. 5,277,815 only to have the halogenated materials re-enter the ground water from the contaminated overlying unsaturated zones.

TEST METHODS

Standard test methods meeting regulatory requirements are used to measure contaminants. For the halogenated hydrocarbons except chloroethene, NIOSH Method 1003 (National Institute of Occupational Safety and Health) and EPA Method 8240 is used. For chloroethene, NIOSH Method 1009 is used. For methane, ethane, and ethene, etc., EPA Method 8015 is used. State or local test method requirements should be reviewed as necessary.

EXAMPLES

Example 1

Use of an Unsaturated Ex Situ Bioreactor to Demonstrate the Biodegradation of Tetrachloroethene A test to demonstrate ex situ the feasibility for bioremediation, such as described in this example, is typically conducted before an in situ process is initiated. Tests were conducted to demonstrate the anaerobic biodegradation of vapors and gases laden with a halogenated hydrocarbon in an unsaturated ex-situ biological reactor using anaerobic microbial reductive dehalogenation.

The biological reactors were built of glass and capped with TEFLON-lined [poly(tetrafluoroethene) resin, E. I. du Pont de Nemours and Company, Wilmington, Del.] septa to prevent the escape of volatile compounds. Before beginning the test, each bioreactor was loaded with 5 g of sphagnum peat moss as the absorptive medium and possible substrate for consuming volatile compounds. Bioreactors which were to serve as sterile controls were then autoclaved. Tetrachloroethene was then added to each bioreactor using a 100 ppm aqueous solution of tetrachloroethene (75 $\mu$M). The bioreactors were allowed to equilibrate for 64 hours. No free water was observed in the reactors.

Biologically active bioreactors containing peat moss and tetrachloroethene received 20 ml of anaerobic digester sludge to which had been added 25 g/L sodium bicarbonate, 5 g/L sodium acetate, 100 mg/L potassium dihydrogen phosphate, 259 mg/L dipotassium hydrogen phosphate, and 100 mg/L diammonium hydrogen phosphate. Sterilized bioreactors received the same augmented sludge, but the sludge was autoclaved to kill the bacteria before addition. The set of reactors which was autoclaved and received the autoclaved amendment served as abiotic controls.

The contents of 3 biologically active samples and 2 abiotic control reactors were sacrificed immediately as the time zero sample. After 3 weeks of incubation, the contents of the next set of bioreactors were analyzed. This group also included 3 biologically active bioreactors and 2 abiotic reactors. The results were then compared and contrasted. At zero time, an average of 57 and 65 pM of tetrachloroethene were detected in the biologically active (Table 1) and sterile controls (Table 2) respectively.

TABLE 1

Averages of Three Biologically Active Replicate Samples

| Compound | $\mu$M at Time Zero | $\mu$M at Time 3 weeks |
|---|---|---|
| Tetrachloroethene | 57 | BDL* |
| Trichloroethene | BDL | 5 |
| cis-1,2-dichloroethene | BDL | 1 |
| trans-1,2-dichloroethene | BDL | 20 |

*BDL: Below detectable limits, 1 ppm

TABLE 2

Averages of Two Sterile Replicate Samples

| Compound | $\mu$M at Time zero | $\mu$M at Time 3 weeks |
|---|---|---|
| Tetrachloroethene | 65 | 68 |
| Trichloroethene | BDL* | BDL |
| cis-1,2-dichloroethene | BDL | BDL |
| trans-1,2-dichloroethene | BDL | BDL |

*BDL: Below detectable limits, 1 ppm

The results showed that, after 3 weeks, no detectable tetrachloroethene could be detected in the biologically active reactor, while the autoclaved control still contained 68 $\mu$M tetrachloroethene. Furthermore, in the biologically active reactor were observed the anaerobic metabolite products trichloroethene, and cis- and trans-1,2-dichloroethane at 5, 1 and 20 $\mu$M, respectively. None of these degradation products was present after 3 weeks in abiotic reactors, indicating that no detectable abiological degradation of these compounds was occurring.

After an additional 20 weeks of incubation, chloroethene, ethane, and ethene were detected only in the biologically active bottles. Mass balance calculation accounted for approximately 20% of the tetrachloroethene as ethene. The rate of tetrachloroethene degradation in this experiment approximated 0.54 $\mu$mol tetrachloroethene/g peat/day. This ex situ bioreactor test indicated that volatile halogenated compounds were microbiologically degraded to non-toxic compounds such as ethene in an unsaturated bioreactor.

Example 2

Figure 1:
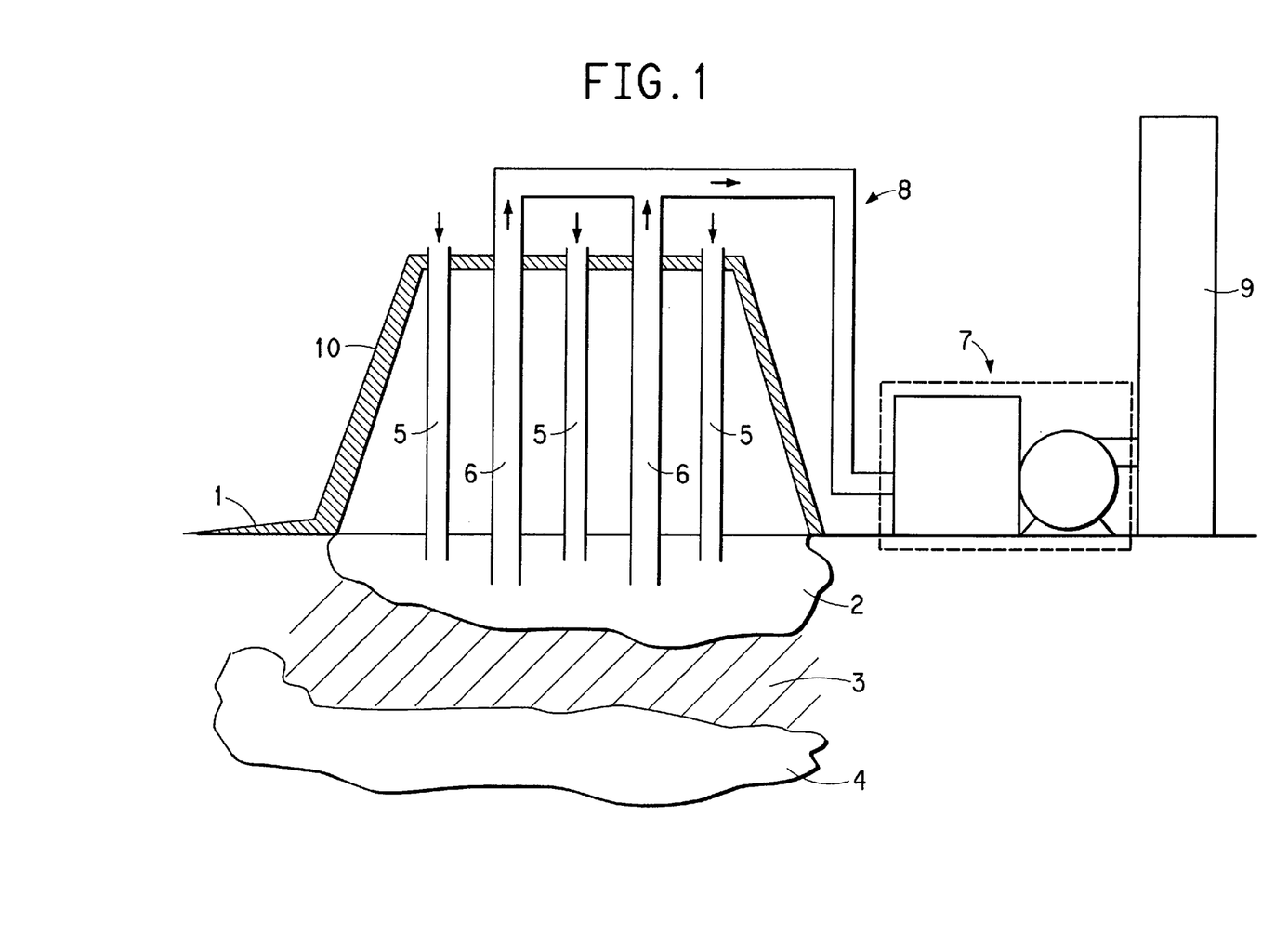
FIG. 1 is a vertical cross section of the contaminated site used in Example 2.
Figure 2:
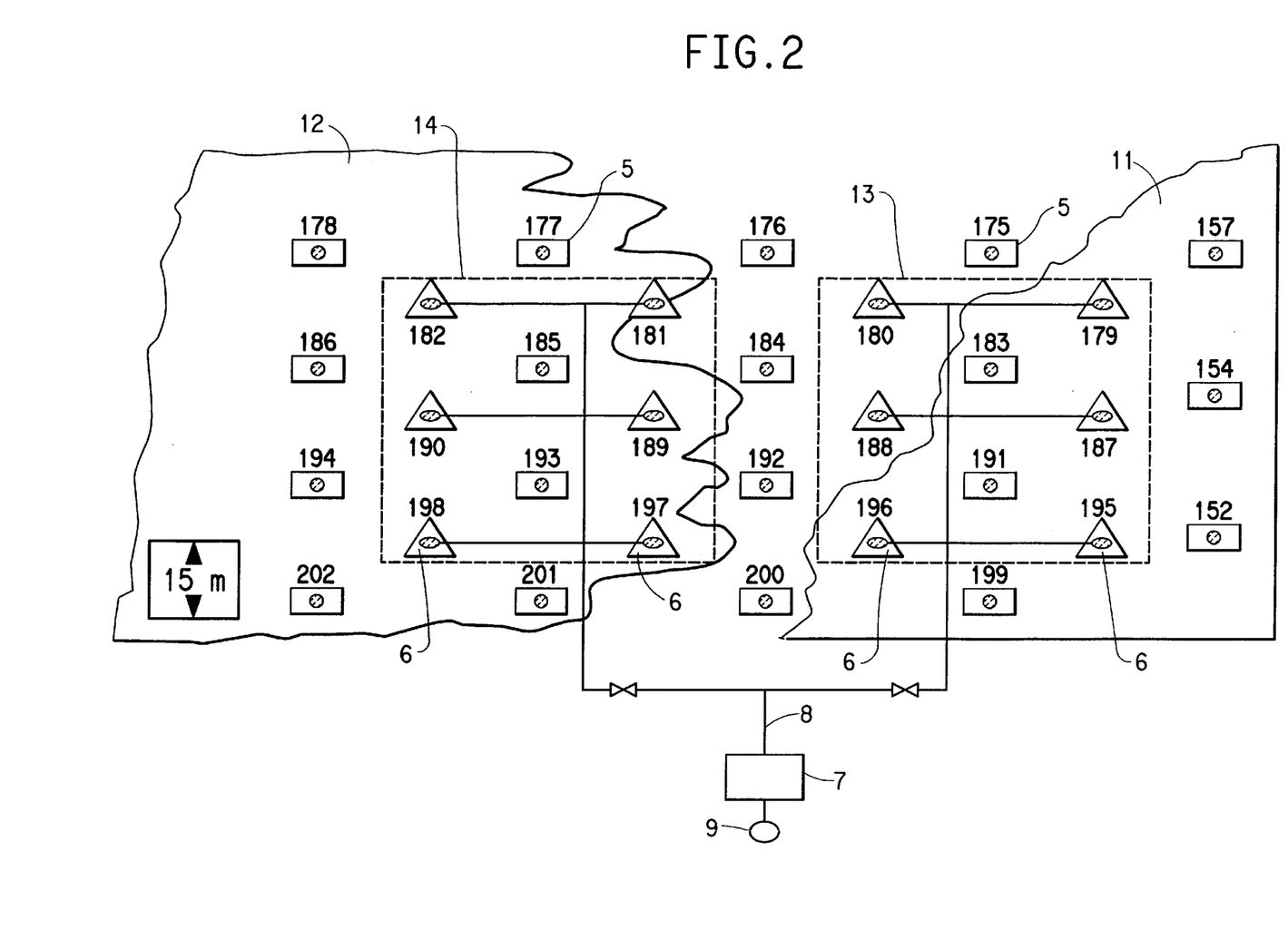
FIG. 2 is a plan of the contaminated site used in Example 2.

Demonstration of the In Situ Bioventing System to Remediate a Site (A) Description of the Landfill Site Reference in this example is made to FIGS. 1 (a vertical cross section of the contaminated site) and 2 (a plan of the contaminated site). As shown in FIG. 1, the ground surface is indicated by line 1. The contaminated landfill area consisted of a zone of sand 2 with some clay 3, together 28 to 33 feet deep, overlying a saturated zone 4. The saturated zone was a ground water aquifer. The landfill surface was elevated above the ground level and protected against rainwater penetration and erosion by a clay cap 10. Four vapor wells were initially installed for evaluation of the site, one was used as a vacuum extraction well for vapor by attaching a regenerative blower, the others were used as observation wells in accordance with the methods of Johnson, et al., in the previously cited references. Vacuum extraction samples were analyzed according to EPA Method 8240. The soil vapor conductivity in the sandy unsaturated zone was 5.2× $10^{-4}$ cm/sec. The four test wells were used to obtain or determine site parameters, such as radii of influence, vapor concentrations, design flow and vacuum, well spacing, equipment sizing, quantity of contaminants, efficiency of removal, and anticipated duration of treatment. The estimated gas flow rate in the unsaturated zone, in the absence of applied pressure gradients, is negligible, and dominated by diffusion, the estimated underlying aquifer flow rate is about 0.27 m/day.

Twelve 4-inch vapor extraction wells 6, such as those shown in FIG. 1, equipped with slotted casings, control valves, and orifice meters, were installed for the remediation of the approximately 0.8 hectare (2-acre) site. The extraction wells 6 penetrated down to, but not into, the saturated zone. As shown in FIG. 1, the extraction wells 6 were connected by piping and manifolds 8 to a Soil Vapor Extraction Unit (SVE) 7 which was connected to a Scrubber 9. Sampling ports, control valves, and orifice meters were installed at each extraction well 6. A sampling port was installed at the inlet to the SVE unit 7. As shown in FIG. 2, control valves were also installed in the manifolds 8 between each well field 13 and 14 and the SVE unit 7. Nineteen passive induction wells 5, as shown in FIG. 2 and numbered 152, 154, 157, 175, 176, 177, 178, 183, 184, 185, 186, 191, 192, 193, 194, 199, 200, 201, and 202, were installed within and around the periphery of the site, also penetrating down to, but not into, the saturated zone. The induction wells were open to the atmosphere. The wells were located so that the radii of influence just overlapped each other.

Two distinct areas existed as shown on FIG. 2, an inactive withdrawal zone 14, principally contaminated with tetrachloroethene and extending throughout most of the field 12; and an active withdrawal zone 13, principally contaminated with non-halogenated organic compounds extending throughout the field 11. In FIG. 2, the induction wells 5 are denoted as numbered rectangles, and the extraction wells 6 are denoted as numbered triangles. The wells are referred to by number hereinafter. The Soil Vapor Extraction Unit (SVE) 7, piping and manifolds 8 connecting the SVE 7 to the extraction wells 6, and the Scrubber 9 as shown in FIG. 2 correspond to these same elements in FIG. 1.

As shown in FIG. 1, the Soil Vapor Extraction Unit 7 contained equipment for the optional removal of volatile compounds in the blower exhaust by thermal oxidation (incineration). Incineration was used when necessary to supplement bioremediation and to ensure emissions met regulatory standards. For operation in the incineration mode, a scrubber 9 cleaned the incinerator exhaust before discharge to the atmosphere.

(B) Contamination History and Content

The tetrachloroethene and trichloroethene were present due to previous disposal practices in which these waste compounds had been placed into a designated waste halogenated solvent pit, directly under some of the extraction wells 6 in the tetrachloroethene-contaminated zone 12. The tetrachloroethene zone 12 contained extraction wells #179, 187, 195, 180, 188, and 196 as shown in FIG. 2. No dichloroethene, chloroethene, ethene, or ethane were used or disposed of at the site, thus the presence of dichloroethene, chloroethene, ethene, or ethane at any location denotes biodegradation products of an anaerobic process.

In contrast to the wells in the tetrachloroethene zone 12, wells 181, 189, 197, 182, 190, and 198, located in the organic-contaminated zone 11 as shown in FIG. 2, yielded samples high in organic hydrocarbon compounds by Organic Volatile Analysis (OVA), and methane and cyclooctadiene analyses, compared with the tetrachloroethene-contaminated zone 12. In the tetrachloroethene zone with methane and cyclooctadiene present, as air was drawn in, both a cometabolic and an aerobic environment were created. The OVA analyses were performed using a Century Portable Organic Vapor Analyzer Model OVA-108 (Foxboro Co., S. Norwalk Conn. ) after calibration with methane according to the operating and service manual on Century Portable Organic Vapor Analyzers, Models OVA-88, OVA-98 and OVA-108 Revision B. Sample analysis results are shown in Tables 3 and 4. The wells in the organic-contaminated zone 11 were located over designated waste solvent pits used for organic material, but not halogenated compounds. Benzene was present in both zones at approximately equal concentrations. Toluene was also present in both zones, higher in the tetrachloroethene-contaminated zone. Again, as air was drawn into zones in which toluene and benzene were present, both a cometabolic and an aerobic environment were created.

OVA is a general analysis to indicate the amount of burnable material present. Although OVA is not a specific compound, results from the OVA analysis in ppm by volume were converted to corresponding approximate molar quantities by assuming ideal gas behavior.

The high levels of methane shown in Table 4 were due to microbial action on the buried contaminants in the landfill.

TABLE 3

Averaged Chlorocarbon Content (mol) in Zones at Month 9

| Compound | Zone 11 Wells | | Zone 12 Wells | | Total* in both zones |
|---|---|---|---|---|---|
| | 182 190 198 | 181 189 197 | 180 188 196 | 179 187 195 | |
| Tetrachloroethene | 0.3 | 6.7 | 43.3 | 89.3 | 139.6 |
| Trichloroethene | 0.0 | 0.2 | 1.6 | 2.6 | 4.4 |
| Dichloroet | 0.0 | 1.1 | 8.0 | 13.1 | 22.2 |
| Chloroethene | 4.7 | 1.7 | 4.0 | 8.6 | 19.0 |
| Ethene | 4.9 | 1.2 | 0.0 | 0.0 | 6.1 |
| Ethane | 3.7 | 0.0 | 0.0 | 0.3 | 4.0 |

*Calculated as the product of the sample concentration and the gas phase volume (930 m$^3$) in the well field as defined by the perimeter wells.

TABLE 4

Averaged Organic Content (mol) in Zones at Month 9

| Compound | Zone 11 Wells | | Zone 12 Wells | | Total* in both zones |
|---|---|---|---|---|---|
| | 182 190 198 | 181 189 197 | 180 188 196 | 179 187 195 | |
| OVA | 3.2 | 0.4 | 0.4 | 1.2 | 5.1 |
| Cyclohexane | 2.0 | 0.9 | 0.6 | 1.7 | 5.1 |
| Methane | 540 | 65 | 30 | 102 | 736 |
| Benzene | 6.9 | 3.3 | 1.5 | 9.5 | 21.1 |
| Toluene | 0.0 | 0.2 | 9.3 | 8.4 | 17.8 |
| Cyclooctadiene | 1.4 | 0.8 | 0.1 | 0.5 | 2.8 |

*Calculated as the product of the sample concentration and the gas phase volume in the well field as defined by the perimeter wells [field volume (1285 m$^2$ × 3.8 m = 4900 m$^3$) × effective porosity (19%) = 930 m$^3$].

(C) Operational Modes

The well field at this site was operated in three distinct bioremediation modes. Listed in order of increasing bioremediation effectiveness, the modes were:

1. Static Bioremediation Mode with no vacuum or pressurization at the wells. Gas movement in the field was essentially due to diffusion. See description (D) hereinafter.
2. Dynamic Short Path Bioremediation Mode with vacuum at all extraction wells, drawing gas to the nearest extraction well. See description (E) hereinafter.
3. Dynamic Long Path Bioremediation Mode with vacuum drawing gas from zone 12 to zone 11. See description (F) hereinafter.

(D) Operation in the Static Bioremediation Mode

The well field at this site was multipurpose. At a date (hereinafter initial date) nine months prior to the time the data of Tables 3 and 4 were obtained, the well field was run in a static bioremediation mode, without vacuum extraction at wells 6 or pressurization of the induction wells 5, for a time period of four months. The static bioremediation was in an anaerobic mode. Table 4 shows high initial levels of methane due to microbial action on the buried contaminants in the landfill. The amounts are shown in g-moles (mol), calculated as the material mass in the test zone as defined by the perimeter induction wells (average concentration in six wells×field volume×effective porosity). By observation and the use of vapor phase diffusion models, diffusion of vapors through the induction well perimeter was typically found to be negligible without any force acting to move the gas. The mass balance results for the initial and 4-month sampling events are shown in Table 5.

TABLE 5

In Situ Biodegradation of Chlorinated Aliphatic
Hydrocarbons, Static Bioremediation Mode
(No Extraction or Pressurization of the Wells)

| Compound* | Initial (mol) | 4 Months (mol) | Amount Change (mol) | Amount Degraded mol) (a) | 4-month (b) Degradation Rate (mol/mo) |
|---|---|---|---|---|---|
| Tetrachloroethene | 40.76 | 31.73 | −9.03 | 9.03 | 2.26 |
| Trichloroethene | 0.80 | 0.59 | −0.21 | 9.24 | 2.31 |
| cis-1,2-dichloroethene | 6.04 | 6.74 | 0.7 | 8.54 | 2.14 |
| trans-1,2-dichloroethene | 0 | 0 | 0 | — | — |
| Chloroethene | 0 | 4.31 | 4.31 | 4.23 | 1.06 |
| Ethene | 3.97 | 6.2 | 2.23 | 2.00 | 0.50 |
| Ethane | 0 | 0.91 | 0.91 | (c) | — |
| 1,1- and 1,2-dichloroethane | | | Analyses not performed | | |
| Chloroethane | | | Analyses not performed | | |
| Subtotal, $C_2$ Chlorocarbons | | | 47.60 | 43.37 | |
| Total, $C_2$ Compounds | | | 51.57 | 50.48 | |

*Compounds listed in order of degradation chain.
(a) The approximate amount of a compound degraded in the period is given by the 4-month amount degraded for the preceding compound in the degradation chain minus the period change for the compound. Thus for trichloroethene, the amount degraded was 9.03 − (−0.21) = 9.24, and for chloroethene, the amount degraded was 8.54 − 4.31 = 4.23. See discussion on degradation cascade for static modes in the Detailed Description section and (c) below.
(b) Degradation rates were assumed constant during the 4-month period.
(c) The difference (1.09 mol) between the calculated degradation of ethene (2.00 mol) and the amount of ethane found (0.91) represented the cumulative deficiency of $C_2$ compounds in the mass balance (1.09/51.57 = 2.1%). Causes of such deficiencies are discussed in the Detailed Description.

(E) Operation in the Dynamic Short Path Bioremediation Mode

Two months later (6 months after the initial date), the well field was restarted for a two-week period with all 19 induction wells 5 open to the atmosphere and all 12 extraction wells 6 connected by the open manifold 8 to the SVE 7 as shown in FIG. 2. As air was drawn into the system, the initially anaerobic environment was progressively replaced by both an aerobic environment and a cometabolic environment due to the presence of methane and toluene. No orifice plates were installed in this mode. Manometer readings were uniform throughout the field. Flow and gas characterization data from the field was measured and sampled at the inlet to the SVE unit 7. Field gas phase volume was 930 m$^3$, the extraction rate varied between 0.038 and 0.052 m$^3$s$^{-1}$ (80 and 110 scfm). The vacuum applied to the extraction wells drew gases and vapors from the pits through the unsaturated zone. This path mixed and diluted the organics from zone 11 and tetrachloroethene from zone 12 as shown in as shown in FIG. 2. Microorganisms present in the unsaturated zone biodegraded the electron acceptor, tetrachloroethene, to form decomposition products, including trichloroethene, dichloroethene, ethene, and ethane. In the process, electron donors, such as toluene, cyclohexane and cyclooctadiene, were also biodegraded. At the end of the 2-week period, the pump was shut down and the environment reverted to anaerobic During the two-week operation, the SVE unit removed 842 mol of halogenated contaminants from the field (Table 6). This far exceeded the amount of gas phase halogenated contaminants which were present during the Static Bioremediation Mode (Table 5). The result indicated halogenated contaminants initially present in the field as vapor had been supplemented by halogenated contaminant from the halogenated solvent waste pits or "pool" in zone 12 as shown in FIG. 2. As the gases and vapors were pulled through the unsaturated subsurface they were biodegraded to intermediate and final degradation products. In this case the analyzed halogenated intermediate products were dichloroethenes and chloroethene, and analyzed end products were ethene and ethane.

TABLE 6

Total Halogenated Materials Removed by the SVE Unit and
Rates of Biodegradation in Dynamic Short Path
Bioremediation Mode (2 Weeks Operation)

| Compound | Total Material Removed in 2 Weeks (mol) | Total Material Removed per Month (mol) (a) | Rate (b) of Biodegradation (mol/month) |
|---|---|---|---|
| Tetrachloroethene | 618 | 1342 | 487 |
| Trichloroethene | 19 | 41 | 446 |
| Dichloroethene | 75 | 163 | 283 |
| Chloroethene | 61 | 133 | 150 |
| Ethene | 69 | 150 | 0 |
| Ethane | 0 | 0 | — |
| Total Removed | 842 | 1829 | |

(a) Rate/month = Amount removed in 2 weeks × 365/(14 × 12).
(b) The approximate rate at which a compound was degraded in a period is given by the sum of the total amount of the subsequent degradation product removed during the period plus the period rate of biodegradation for the subsequent degradation product. Thus for dichloroethene, the degradation rate is 150 + 133 = 283, and chloroethene, the rate was 150 + 0 = 150. The causes of deficiencies in the mass balance are discussed in the Detailed Description.

Since the amount of biodegradation products removed was much greater than the gas phase amount present in the static bioremediation mode (Table 5), the extracted amount was approximately the biodegradation rate. The additional material was tetrachloroethene evaporated from the pool of liquid and absorbed contaminant in the unsaturated zone. Thus, based upon the amounts of vapors and gases removed from the field, the "in situ" halogenated biodegradation rates were calculated as 487, 445, 282, and 150 mol/mo for trichloroethene, dichloroethene, chloroethene, ethene and ethane, respectively (Table 6). No production of ethane was observed. The percentage gas compositions between month 6 and that of the initial month were then compared and no notable differences were found, as shown in Table 7. The vacuum had mixed electron acceptor and donor in the presence of microorganisms causing biodegradation of the parent materials.

TABLE 7

Comparison of Static and Dynamic Short Path
Bioremediation Modes in Gas Composition (%)

| Compound | Mol % Gas Composition Initial Date (Static Mode)* | Mol % Gas Composition 2-Week period at Month 6 (Dynamic Short Path Mode)* |
|---|---|---|
| Tetrachloroethene | 79 | 73 |
| Trichloroethene | 1.6 | 2.3 |
| Dichloroethene | 12 | 9 |
| Chloroethene | 0 | 7 |
| Ethene | 8 | 8 |
| Ethane | 0 | 0 |

*Derived as mol component/total $C_2$ mol from Tables 5 and 6.

Comparison of the rate of chlorocarbon degradation product formation in the dynamic short path bioremediation mode to that of the static bioremediation mode indicated biodegradation rates much greater in the dynamic short path bioremediation mode as shown in Table 8. The absence of mixing of electron acceptor and donor materials in the subsurface was the factor limiting biodegradation in the static bioremediation mode. Vacuum extraction in the dynamic short path bioremediation mode resulted in dynamic mixing of the reactants in the presence of microorganisms, thereby relieving the limitation encountered in the static bioremediation mode.

TABLE 8

Comparison between the Static and Dynamic Short Path
Bioremediation Rates

| Compound | Static Mode Biodegradation Rate* (mol/mo) | Dynamic Short Path Biodegradation Rate* (mol/mo) | Ratio of Short Path/ Static Rates |
|---|---|---|---|
| Trichloroethene | 2.31 | 487 | 210 |
| Dichloroethene | 2.14 | 445 | 210 |
| Chloroethene | 1.06 | 282 | 270 |
| Ethene | 0.50 | 150 | 300 |

*Rates from Tables 5 (Static Bioremediation Mode) and 6 (Dynamic Short Path Bioremediation Mode), respectively.

(F) Operation in the Dynamic Long Path Biodegradation Mode

Biodegradation was further improved by shutting off the flow from wells in the high tetrachloroethene zone 12 and installing orifice plates in the wells in the high organic zone 11 as shown in FIG. 2. Gases and vapors were then removed from the wells from the high organic field. In this mode, the tetrachloroethene removed had to be drawn from zone 12 to the high organic zone 11, before being drawn into the SVE 7 through piping and manifolds 8 as shown in FIG. 2. Both cometabolic and aerobic environments existed until the consumption rate of oxygen exceeded the rate at which it was supplied. The environment then reverted to anaerobic and degradation of tetrachloroethene resumed.

In this process, tetrachloroethene and its degradation products were mixed with the electron donors present in the high organic zone 11 and drawn through a longer path, providing increased contact time with both the microorganisms and available electron donors. By comparison, in the dynamic short path bioremediation mode, tetrachloroethene vapors were drawn through a shorter distance to the closest extraction well, a path characterized by lower concentrations of electron donors and shorter contact time. Both factors provided further improvement of the biodegradation processes in the dynamic long path bioremediation mode.

During month 9 after the initial date, the well field and the SVE were operated for 461 hours in the dynamic long path bioremediation mode. The wells were sampled and the flow rate and gas composition determined. The results are shown in Table 9.

TABLE 9

Composition of Gases, Percent Composition, and Rate of
Degradation Product Formation in the Dynamic Long Path
Bioremediation Mode After 461 Hours of Operation

| Compound | Composition of Gas in Waste Stream (mol) | Waste Stream Composition (mol %) | Amount Removed per month (mol) (a) | Rate of Biodegradation (b) (mol/mo) |
|---|---|---|---|---|
| Tetra-chloroethene | 500.0 | 33 | 792 | — |
| Trichloroethene | 17.3 | 1 | 27 | 1570 |
| Dichloroethene | 80.2 | 5 | 127 | 1443 |
| Chloroethene | 469.1 | 31 | 743 | 700 |
| Ethene | 359.2 | 24 | 569 | 131 |
| Ethane | 83.1 | 6 | 131 | |
| Total | 1508.9 | 100 | 2389 | |

(a) Rate = Composition × 365 × 24/(461 × 12).
(b) The approximate rate at which a compound was degraded in a period is given by the sum of the total amount of the subsequent degradation product removed during the period plus the period rate of biodegradation for the subsequent degradation product. Thus for dichloroethene, the degradation rate was 743 + 700 = 1443, and for chloroethene, the rate was 569 + 131 = 700. The causes of deficiencies in the mass balance are discussed in the Detailed Description.

In Table 10, the results for the static bioremediation mode and dynamic short and long path bioremediation modes are compared.

TABLE 10

Comparison of Rate of Decomposition Product Formation
Between Static Bioremediation Mode and Dynamic
Short and Long Path Bioremediation Modes

| | Decomposition Product Formation Rate (mol/mo) | | | Detradation Rate Ratio, Long Path |
|---|---|---|---|---|
| Compound | Static Mode (Table 5) | Short Path Mode (Table 6) | Long Path Mode (Table 9) | Mode/ Short Path Mode |
| Tetrachloroethene | — | — | — | — |
| Trichloroethene | 2.31 | 487 | 1570 | 3.2 |
| Dichloroethene | 2.14 | 445 | 1443 | 3.2 |
| Chloroethene | 1.06 | 282 | 700 | 2.5 |
| Ethene | 0.50 | 150 | 131 | 0.9 |
| Ethane | 0.27 | 0 | — | — |

The results showed that, while the ethene formation rate was comparable in the dynamic short and long path bioremediation modes, the rates of formation of trichloroethene, dichloroethene, and chloroethene increased about 3-fold from the dynamic short path to the dynamic long path bioremediation mode. Ethane was produced at a rate of 131 mol/mo, but was not detected in the dynamic short path mode.

Table 11 compares the decomposition product concentrations in the gas stream extracted in the static and dynamic short and long path bioremediation modes. Tetrachloroethene, which was 73–79 mol % in the static and dynamic short path bioremediation modes, respectively, decreased to 33%. Both trichloroethene and dichloroethene percentages remained low. Chloroethene, below detectable limits and 8 mol % in the static and dynamic short path bioremediation modes, respectively, increased to 31% in the dynamic long path bioremediation mode. Ethene, 7 and 8 mol % in the static and dynamic short path bioremediation modes, respectively, increased to 24% in the dynamic long path bioremediation mode. Finally, ethane, unobserved in the dynamic short path bioremediation mode, increased to 6%. These changes indicate the dynamic long path bioremediation mode increased biodegradation.

TABLE 11

Comparison of the Percentage Waste Stream Composition between Static and Short and Long Path Bioremediation Modes

| | Waste stream Composition (%) | | |
| --- | --- | --- | --- |
| Compound | Static Mode | Short Path Mode | Long Path Mode |
| Tetrachloroethene | 79 | 73 | 33 |
| Trichloroethene | 1.6 | 2.3 | 1.1 |
| Dichloroethene | 12 | 9 | 5.3 |
| Chloroethene | 0 | 7 | 31 |
| Ethene | 7 | 8 | 24 |
| Ethane | 0 | 0 | 6 |

Analyses were also made to measure the formation of degradation products within the well field. As indicated in Table 3, tetrachloroethene concentrations are high in all the wells of zone 12, namely wells 179, 180, 187, 188, 195 and 196. In this zone 12, little or no ethene and ethane formation was observed. However, as tetrachloroethene is drawn the longest distance into and across the high organic zone 11, namely to wells 182, 190, and 198, then the larger amounts of ethene and ethane are formed. This indicated a longer path and/or more electron donor may be needed to completely biodegrade the halogenated hydrocarbon coming from the high tetrachloroethene zone.

What is claimed is:

1. A process for biodegrading halogenated aliphatic hydrocarbons or halogenated fuel components, said halogenated fuel components selected from the group consisting of halogenated benzene, halogenated toluene, halogenated xylene, and halogenated ethylbenzene, in a soil zone between the ground surface and underlying water table, comprising
   A) contacting in situ in said soil zone in a gas phase or vapor phase 1) an electron donor compound contained in or added to said soil zone with 2) dehalogenating bacteria indigenous in or added to said soil zone and 3) said halogenated aliphatic hydrocarbons or said halogenated fuel components present in said soil zone, by inducing and controlling gas flow through said soil zone; and
   B) stimulating by said contacting anaerobic biodegradation of said halogenated aliphatic hydrocarbons or said halogenated fuel components.

2. The process of claim 1 wherein the soil zone between the ground surface and underlying water table is initially an aerobic environment.

3. The process of claim 1 wherein the soil zone between the ground surface and underlying water table is initially an anerobic environment.

4. The process of claim 1 wherein the soil zone between the ground surface and underlying water table is initially a cometabolic environment.

5. The process of claim 3 further comprising converting the soil zone between the ground surface and underlying water table from an anaerobic to an aerobic environment by supplying a source of oxygen to activate aerobic bacteria to aerobically degrade the halogenated organic compounds.

6. The process of claim 3 further comprising converting the soil zone between the ground surface and underlying water table from an anaerobic to a cometabolic environment by supplying a source of cometabolic activity to cometabolically degrade the halogenated organic compounds.

7. The process of claim 1 further comprising cycling between anaerobic, aerobic or cometabolic environments in any sequence as needed to degrade said halogenated aliphatic hydrocarbons or said halogenated fuel components to innocuous compounds and water.

8. The process of claim 7 wherein said cycling is in a sequence selected from the group consisting of:
   a) anaerobic to aerobic,
   b) anaerobic to cometabolic,
   c) aerobic to anaerobic,
   d) cometabolic to anaerobic,
   e) anaerobic to aerobic to cometabolic,
   f) anaerobic to cometabolic to aerobic,
   g) aerobic to anaerobic to cometabolic,
   h) aerobic to cometabolic to anaerobic,
   i) aerobic to anaerobic to aerobic to cometabolic,
   j) cometabolic to aerobic to anaerobic, and
   k) cometabolic to anaerobic to aerobic
to degrade said halogenated aliphatic hydrocarbons or said halogenated fuel components to innocuous compounds and water.

9. The process of claim 1 wherein the electron donor is provided by adding it into the soil zone between the ground surface and underlying water table.

10. The process of claim 1 wherein the electron donor is an inorganic or organic compound.

11. The process of claim 1 wherein the electron donor is selected from the group consisting of hydrogen; sugars; volatile fatty acids and their salts; aliphatic, cycloaliphatic and aromatic hydrocarbins; and alcohols, amines, phenols, aldehydes, and ketones of aliphatic, cycloaliphatic, and aromatic hydrocarbons.

12. The process of claim 5 wherein the source of oxygen is provided by venting air or oxygen into the soil zone between the ground surface and underlying water table.

13. The process of claim 6 wherein the source of cometabolic activity is a cometabolic substrate which causes the bacteria to produce a cometabolic enzyme which oxidizes said halogenated aliphatic hydrocarbons or said halogenated fuel components.

14. The process of claim 13 wherein the source of cometabolic substrate is selected from the group consisting of phenol, methane, ammonia, toluene, propane, butane, o-cresol, m-cresol, trytophane, tetrachloroethene, trichloroethene, cis and trans-dichloroethene, and chloroethene.

15. The process of claim 1 further comprising addition of dehalogenating bacteria, aerobic bacteria, anaerobic bacteria or cometabolic bacteria to said soil zone between the ground surface and underlying water table.

16. The process of claim 15 wherein the bacteria are of a genus selected from the group consisting of Desulfomonile, Desulfobacterium, Methanobacterium, and Methanosarcina.

* * * * *